United States Patent
Nakai et al.

(10) Patent No.: US 12,345,292 B2
(45) Date of Patent: Jul. 1, 2025

(54) SLIDING MEMBER AND METHOD FOR PRODUCING THE SAME

(71) Applicant: DAIDO METAL COMPANY LTD., Aichi (JP)

(72) Inventors: Masahiro Nakai, Aichi (JP); Ryo Asaba, Aichi (JP)

(73) Assignee: DAIDO METAL COMPANY LTD., Aichi (JP)

( * ) Notice: Subject to any disclaimer, the term of this patent is extended or adjusted under 35 U.S.C. 154(b) by 103 days.

(21) Appl. No.: 18/377,197

(22) Filed: Oct. 5, 2023

(65) Prior Publication Data
US 2024/0117839 A1    Apr. 11, 2024

(30) Foreign Application Priority Data
Oct. 11, 2022  (JP) .................... 2022-163240

(51) Int. Cl.
*F16C 17/02* (2006.01)
*B23K 9/04* (2006.01)
(Continued)

(52) U.S. Cl.
CPC ............ *F16C 17/02* (2013.01); *B23K 9/042* (2013.01); *C21D 9/0068* (2013.01); *C22C 9/02* (2013.01);
(Continued)

(58) Field of Classification Search
CPC ........ F16C 17/02; F16C 33/12; F16C 33/121; F16C 33/122; F16C 33/124; F16C 33/125;
(Continued)

(56) References Cited

U.S. PATENT DOCUMENTS

| 2015/0111793 A1 | 4/2015 | Badrak |
| 2018/0112302 A1 | 4/2018 | Grensing et al. |
| 2018/0258991 A1* | 9/2018 | Toda .................. C23C 28/021 |

FOREIGN PATENT DOCUMENTS

| CN | 104907771 A | * | 9/2015 | ............... B23P 15/00 |
| CN | 109296643 A | * | 2/2019 | ............ C22C 21/003 |

(Continued)

OTHER PUBLICATIONS

Extended European Search Report dated Feb. 15, 2024, for European Patent Application No. 23200898.7.

*Primary Examiner* — Phillip A Johnson
(74) *Attorney, Agent, or Firm* — KARCESKI IP LAW, PLLC

(57) ABSTRACT

A sliding member includes a substrate containing Fe as a main component and an alloy layer overlaid on the substrate and composed of a Cu-base alloy containing 6 to 12% by mass of Ni and 3 to 9% by mass of Sn. The alloy layer has a body layer and an intermediate layer. The body layer is formed of the Cu-base alloy, while the intermediate layer is composed of an alloy containing Ni, Sn, and Cu which are derived from the Cu-base alloy and Fe derived from the substrate. Taking side close to the substrate as a lower region and the other side as an upper region, a ratio of the total area of hard phases to the observation section of the upper region is 1.2 to 3.0, where the ratio of the total area of the hard phases to the observation section of the lower region is set at 1.

4 Claims, 12 Drawing Sheets

(51) Int. Cl.
  *C21D 9/00* (2006.01)
  *C22C 9/02* (2006.01)
  *C22C 9/06* (2006.01)
  *F16C 3/12* (2006.01)
  *F16C 33/14* (2006.01)
  *B23K 103/02* (2006.01)
  *B23K 103/04* (2006.01)
  *B23K 103/12* (2006.01)

(52) U.S. Cl.
  CPC ............ *C22C 9/06* (2013.01); *B23K 2103/02* (2018.08); *B23K 2103/04* (2018.08); *B23K 2103/12* (2018.08); *F16C 2204/10* (2013.01); *F16C 2220/24* (2013.01)

(58) Field of Classification Search
  CPC ................ F16C 33/127; F16C 2204/10; F16C 2204/12; F16C 2220/24; B23K 9/04; B23K 9/042; B23K 2103/02; B23K 2103/12; C21D 9/0068; C22C 9/02; C22C 9/06
  See application file for complete search history.

(56) References Cited

FOREIGN PATENT DOCUMENTS

| | | | |
|---|---|---|---|
| CN | 113293369 A | 8/2021 | |
| DE | 10108344 A1 * | 9/2001 | ........... C23C 14/024 |
| DE | 102017129361 A1 * | 6/2019 | |
| JP | S5881566 A | 5/1983 | |
| JP | S62267078 A | 11/1987 | |
| JP | H10158766 A | 6/1998 | |

* cited by examiner

Fig.10

| Wind speed | 3m/s |
|---|---|
| Surface pressure | 2MPa/step |
| Type of lubricating oil | VG320 |
| Lubrication method | Oil bath |
| Lubricating oil temperature | 80°C |
| Test time | 5min/step |
| Material of counterpart member | SCM440 |
| Roughness of counterpart member | Ra0.2~0.3 |

Fig.11

| | |
|---|---|
| Wind speed | 0.5m/s |
| Surface pressure | 15MPa |
| Type of lubricating oil | VG320 |
| Lubrication method | Oil bath |
| Lubricating oil temperature | 80°C |
| Test time | 120min |
| Material of counterpart member | SCM440 |
| Roughness of counterpart member | Ra0.2~0.3 |
| Operating pattern | Up: 0.5 s, hold: 1 s |
| | Down: 0.5 s, stop: 1 s |

Fig.12

| | | Sliding member | | | | Heat treatment | | Hard phase | | | Test result | |
|---|---|---|---|---|---|---|---|---|---|---|---|---|
| | No. | Alloy layer | | Substrate | Welding method | Temp. (°C) | Time (hr) | Average particle size (μm) | Ratio R | Adhesive strength (N/mm²) | Maximum surface pressure (MPa) | Abrasion loss (μm) |
| | | Body layer | Intermediate layer | | | | | | | | | |
| Example | 1 | CuNiSn | CuNiFeSn | C60 | MIG(CMT) | 400 | 6 | 1.0 | 1.8 | 400 | 25 | 2 |
| | 2 | CuNiSn | CuNiFeSn | S45C | MIG(CMT) | 385 | 8 | 0.5 | 3.0 | 407 | 25 | 4 |
| | 3 | CuNiSn | CuNiFeSn | S55C | MIG(CMT) | 370 | 4 | 0.7 | 1.4 | 389 | 25 | 4 |
| | 4 | CuNiSn | CuNiFeSn | SS400 | MIG(CMT) | 420 | 8 | 1.8 | 2.0 | 435 | 25 | 2 |
| | 5 | CuNiSn | CuNiFeSn | SCM435 | MIG(CMT) | 430 | 10 | 2.0 | 3.0 | 410 | 25 | 2 |
| | 6 | CuNiSn | CuNiFeSn | SS400 | TIG | 390 | 5 | 0.8 | 1.2 | 377 | 25 | 4 |
| | 7 | CuNiSn | CuNiFeSn | S45C | MIG | 400 | 6 | 0.9 | 1.4 | 410 | 25 | 4 |
| Comparative Example | 1 | CuNiSn | CuNiFeSn | C60 | MIG(CMT) | 360 | 4 | 0.1 | 1.0 | 368 | 12 | 9 |
| | 2 | CuNiSn | CuNiFeSn | C60 | MIG(CMT) | 450 | 8 | 4.0 | 3.5 | 358 | 10 | 8 |
| | 3 | CuSn | — | SS400 | MIG(CMT) | 400 | 6 | — | — | 88 | 4 | 8 |
| | 4 | CuAl | — | SCM435 | MIG | 400 | 6 | — | — | 48 | 6 | 15 |
| | 5 | CuZn | — | S45C | TIG | 400 | 6 | — | — | — | — | — |
| | 6 | CuNiSn | — | C60 | MIG(CMT) | 400 | 6 | 1.2 | 1.0 | 90 | 20 | 4 |
| | 7 | CuSn | Ni | SS400 | MIG(CMT) | 400 | 6 | — | — | 412 | 4 | 12 |
| | 8 | CuAl | CuNi | SS400 | MIG(CMT) | 430 | 10 | — | — | 398 | 6 | 16 |

SLIDING MEMBER AND METHOD FOR PRODUCING THE SAME

CROSS-REFERENCE TO RELATED APPLICATION(S)

This United States Patent Applications relies on and claims priority to Japanese Patent Application No. 2022-163240, filed on Oct. 11, 2022, the entire contents of which are incorporated herein by reference.

FIELD OF THE INVENTION

The present embodiment relates to a sliding member and a method for producing the same.

BACKGROUND OF THE INVENTION

Under severe conditions of high load applied and repeated start and stop cycles, a sliding member that supports a rotating shaft is required to have high strength and durability. In such a sliding member, an Fe-based substrate is used to ensure strength and durability, and a Cu-based alloy layer is overlaid on a surface thereof as an alloy layer for a bearing.

In general, a Cu-based alloy has a characteristic of low solid solution limit with respect to a Fe-based substrate. Therefore, Fe is easily eluted when the Fe forms a solid solution in a Cu-based alloy by excessive penetration, and cracking and delamination easily occur when a Cu-based alloy layer is formed on the Fe-based substrate. Especially, in the case of welding the Cu-based alloy to the Fe-based substrate, a phenomenon of insertion of the Cu-based alloy into the substrate occurs, causing cracking and delamination at the boundary between the substrate and a welding layer. Conventionally, an intermediate layer composed of other metals or alloys is formed between the substrate and the alloy layer to reduce this insertion of the Cu-based alloy into the substrate, (See Japanese Patent Laid-Open No. 56-179020 and Japanese Patent Laid-Open No. 62-267078, for example). By forming the intermediate layer, the insertion of the Cu-based alloy into the substrate is reduced.

However, the formation of the intermediate layer requires a separate step in addition to the step of forming the Cu-based alloy on the Fe-based substrate. In particular, the formation of the alloy layer by welding from the viewpoint of reducing manufacturing costs, as in the case of sliding members applied to large-scale equipment, causes a problem of an increase in the number of steps to form the intermediate layer. In addition, the intermediate layer requires a material different from those of the substrate and the alloy layer, making handling complicated.

An object of the present invention is to provide a sliding member and a method for producing the same, which reduce the insertion of a Cu-based alloy into an Fe-based substrate during welding and further improve the strength without requiring an increase in man-hours.

SUMMARY OF THE INVENTION

To solve the above problems, a sliding member according to one embodiment includes a substrate containing Fe as a main component and an alloy layer overlaid on the substrate and composed of a Cu-base alloy containing 6 to 12% by mass of Ni and 3 to 9% by mass of Sn.

The alloy layer has a body layer and an intermediate layer. The body layer is formed of the Cu-base alloy. The intermediate layer is composed of an alloy containing Ni, Sn, and Cu which are derived from the Cu-base alloy and Fe derived from the substrate. The alloy layer has a hard phase composed of a compound of Ni, Sn, and Cu which are derived from the Cu-base alloy as well as a flake phase including the hard phase and a matrix of the Cu-base alloy. In an arbitrary observation section taken along a thickness direction of the alloy layer, when the alloy layer is divided at the middle in the thickness direction to set a side close to the substrate as a lower region and the other side away from the substrate as an upper region, a ratio of a total area of the hard phases to the observation section of the upper region is 1.2 to 3.0, where a ratio of the total area of the hard phases to the observation section of the lower region is set at 1.

The alloy layer has a body layer and an intermediate layer. The body layer and the intermediate layer are formed simultaneously when the alloy layer is formed by welding. That is, the Cu-base alloy deposited on the substrate during welding generates an alloy to be the intermediate layer at the interface with Fe of the substrate from Ni, Sn, and Cu which are derived from the Cu-base alloy and Fe derived from the substrate. On the other hand, in a region excluding the interface between the alloy layer and the substrate, the body layer is formed of the Cu-base alloy. In the present embodiment, the intermediate layer is formed at the interface with the substrate simultaneously when the alloy layer is welded, in addition to the body layer. Ni contained in the Cu-base alloy has a high affinity with Fe that forms the substrate. Therefore, Ni contained in the Cu-base alloy and Fe contained in the substrate form an intermediate layer having a composition different from that of the Cu-base alloy that forms the alloy layer at the interface between the alloy layer and the substrate. That is, the intermediate layer is formed simultaneously with the welding of the alloy layer. As a result, the phenomenon of the insertion of the Cu-based alloy into the Fe substrate during welding is prevented by the intermediate layer, thereby reducing cracking and delamination.

In the alloy layer according to one embodiment, the ratio of the total area of the hard phases to the observation section of the upper region is 1.2 to 3.0, where the ratio of the total area of the hard phases to the observation section of the lower region is set at 1. The hard phase is harder than the matrix of the Cu-base alloy constituting the alloy layer. When the alloy layer and the counterpart member slide against one another, the hard phase thus contributes to reduction in wear of the alloy layer. On the other hand, the hard phase is a factor in reducing the adhesive force between the substrate and the alloy layer. By making a distribution ratio of the hard phase different between the lower region and the upper region, wear of the alloy layer is reduced in the upper region, and delamination between the substrate and the alloy layer is reduced in the lower region.

Therefore, the strength can be further improved without requiring man-hours necessary to form the intermediate layer.

BRIEF DESCRIPTION OF THE DRAWINGS

FIG. 10 is a chart summarizing test conditions of the seizure test;

FIG. 11 is a chart summarizing test conditions of the wear test; and

FIG. 12 is a chart summarizing test results of Examples and Comparative Examples.

DETAILED DESCRIPTION OF EMBODIMENT(S) OF THE INVENTION

A sliding member according to one embodiment is described below with reference to the drawings.

Figure 1:
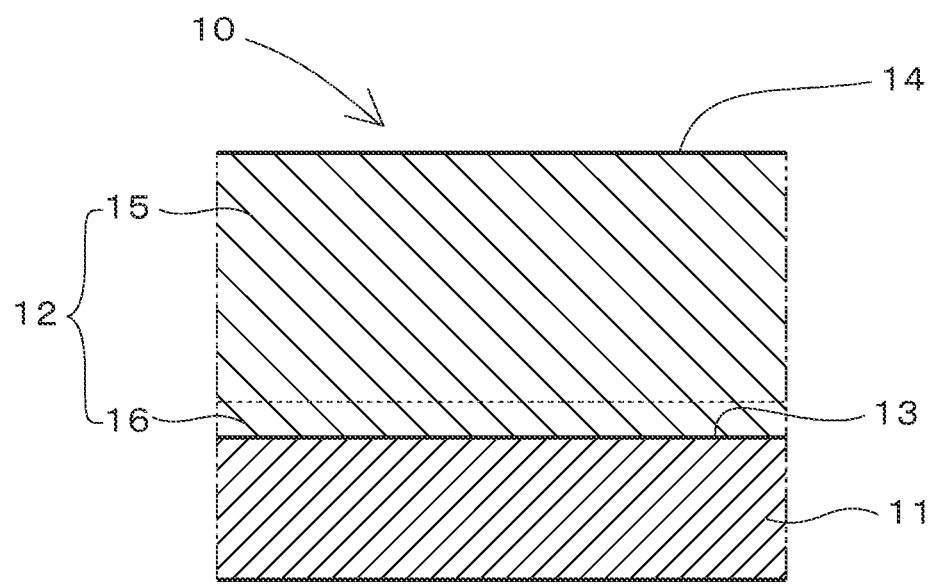
FIG. 1 is a schematic cross sectional view of a structure of a sliding member according to one embodiment.

As shown in FIG. 1, a sliding member 10 includes a substrate 11 and an alloy layer 12. The alloy layer 12 is provided on the substrate 11 by welding it to an interface 13, one side of the substrate 11. The sliding member 10 has a surface of the alloy layer 12, i.e., an end surface of the alloy layer 12 opposite to the substrate 11, as a sliding surface 14 that slides with a counterpart member (not shown).

The substrate 11 is a so-called back metal layer and is formed of a material containing Fe as a main component. Examples of the substrate 11 containing Fe as the main component include hypoeutectoid steel, eutectoid steel, hypereutectoid steel, cast iron, high-speed steel, tool steel, austenitic stainless steel, and ferrite stainless steel.

The alloy layer 12 is a Cu-base alloy containing Cu as the main component. The alloy layer 12 is a CuSnNi alloy containing 6 to 12% by mass of Ni and 3 to 9% by mass of Sn. In other words, the alloy layer 12 contains at least these Ni and Sn. The alloy layer 12 has a body layer 15 and an intermediate layer 16. The body layer 15 is formed of the Cu-base alloy that forms the alloy layer 12. In other words, the body layer 15 is a Cu-base alloy containing Ni, Sn, and an inevitable impurity. The intermediate layer 16 is an alloy containing Ni, Sn, and Cu which are derived from the Cu-base alloy that forms the alloy layer 12 and Fe derived from the substrate 11. In other words, the intermediate layer 16 is formed of an alloy containing Ni, Sn, Cu, and an inevitable impurity which are derived from the Cu-base alloy and Fe derived from the substrate 11. Ni contained in the Cu-base alloy has a high affinity with Fe constituting the substrate 11. Therefore, when the alloy layer 12 is formed on the substrate 11 by welding, Ni contained in the molten alloy layer 12 moves to the interface 13 with the substrate 11 containing Fe as the main component, whereby the intermediate layer 16 containing Fe is formed at the interface 13 between the substrate 11 and the alloy layer 12. As a result, the alloy layer 12 has the body layer 15 composed of a Cu-base alloy and the intermediate layer 16 composed of an alloy containing Fe.

Figure 2:
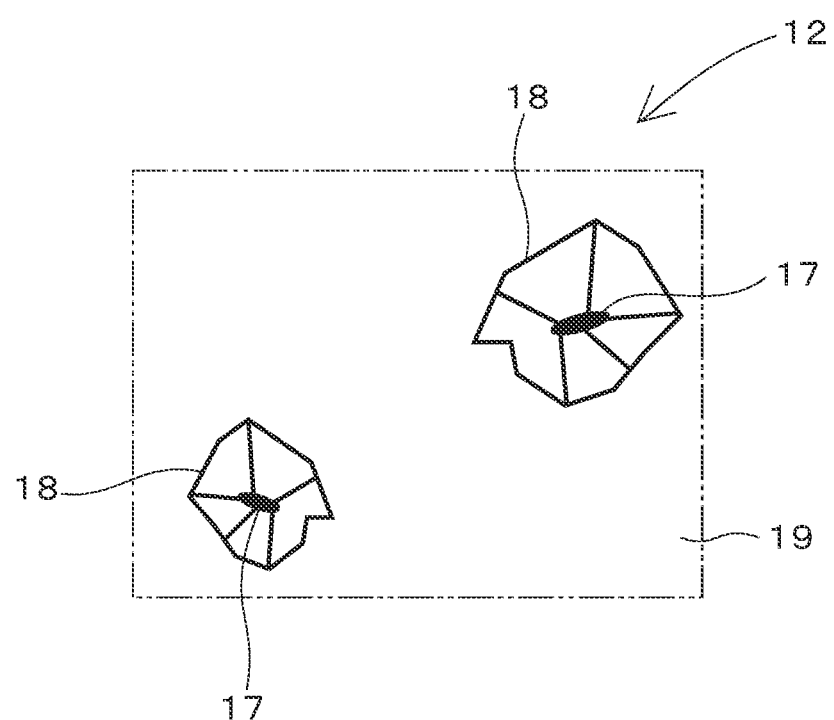
FIG. 2 is a schematic view of a microstructure of a hard phase and a flake phase in an alloy layer of a sliding member according to one embodiment.

As shown in FIG. 2, the alloy layer 12 has a hard phase 17 and a flake phase 18. The hard phase 17 is a metastable phase composed of an alloy, such as (Cu·Ni)$_3$Sn, derived from Ni, Sn, and Cu contained in the Cu-base alloy. The alloy layer 12 surrounds the hard phase 17 and the flake phase 18 with a matrix 19 of the Cu-base alloy. The flake phase 18 has a microstructure in which a portion composed of components forming the hard phase 17 and a portion composed of components forming the matrix 19 are layered one on another. The flake phase 18 exists so as to wrap the whole or a part of the hard phase 17 by this microstructure. The alloy layer 12 consists of the flake phase 18 in a layer form wrapping the hard phase 17 and the matrix 19.

Figure 3:
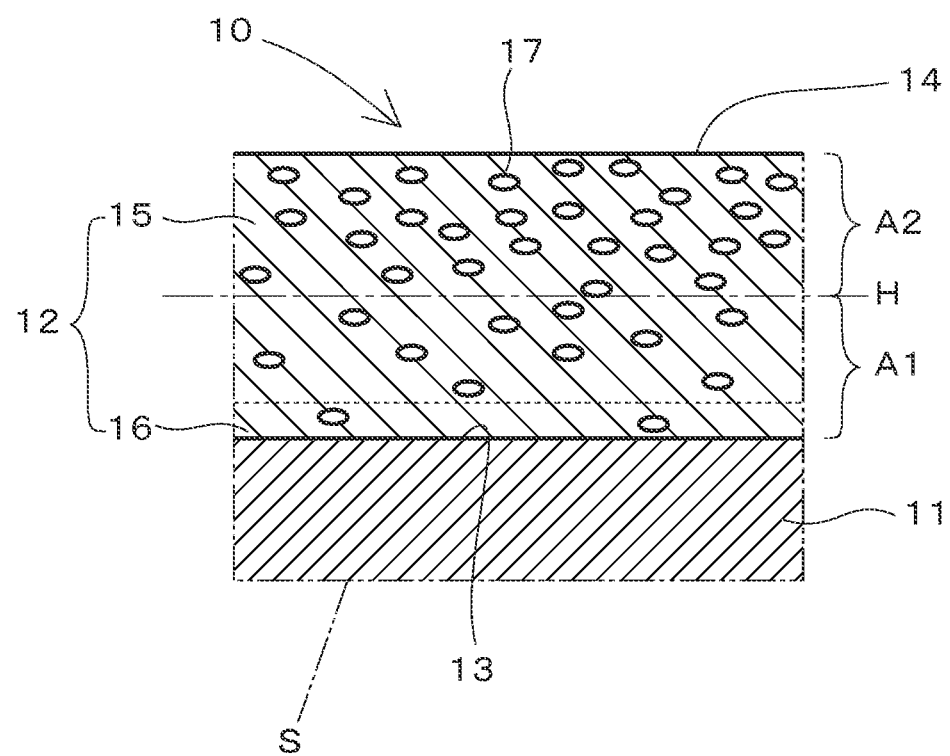
FIG. 3 is a schematic view of a structure of a sliding member according to one embodiment.

The alloy layer 12 has a prescribed ratio R of the total area of hard phases 17 in an arbitrary cross section taken through the thickness. Specifically, as shown in FIG. 3, the alloy layer 12 for which an observation section S is set has a lower region A1 on the side of the substrate 11 and an upper region A2 on the side opposite to the substrate 11, i.e., on the side of the sliding surface 14, with the middle H of the thickness of the alloy layer 12 as the boundary. In this case, the ratio R of the total area of the hard phases 17 to the observation section S of the upper region A2 is 1.2 to 3.0, where the ratio of the total area of the hard phases 17 to the observation section S of the lower region A1 is set at 1. In other words, the hard phase 17 contained in the upper region A2 are 1.2 to 3.0 times or more than in the lower region A1.

The hard phase 17 is harder than the matrix of the Cu-base alloy constituting the alloy layer 12. When the alloy layer 12 and the counterpart member (not shown) slide against one another, the hard phase 17 thus contributes to reduction in wear of the alloy layer 12. On the other hand, the hard phase 17 affects the adhesive force between the substrate 11 and the alloy layer 12. When a load is applied to the sliding member 10 including the alloy layer 12 from the counterpart member (not shown), the sliding member 10 is deformed, for example, by deflection. This deformation is a factor in the delamination between the substrate 11 and the alloy layer 12. If there is a large amount of the hard phase 17 near the interface 13, the delamination between the substrate 11 and the alloy layer 12 is more likely to occur. By making the distribution of the hard phase 17 different between the lower region A1 and the upper region A2, the wear of the alloy layer 12 is reduced in the upper region A2, while the delamination between the substrate 11 and the alloy layer 12 is reduced in the lower region A1. As a result, the sliding member 10 can enhance the adhesion between the substrate 11 and the alloy layer 12 as well as seizure resistance and wear resistance of the alloy layer 12.

Figure 4:
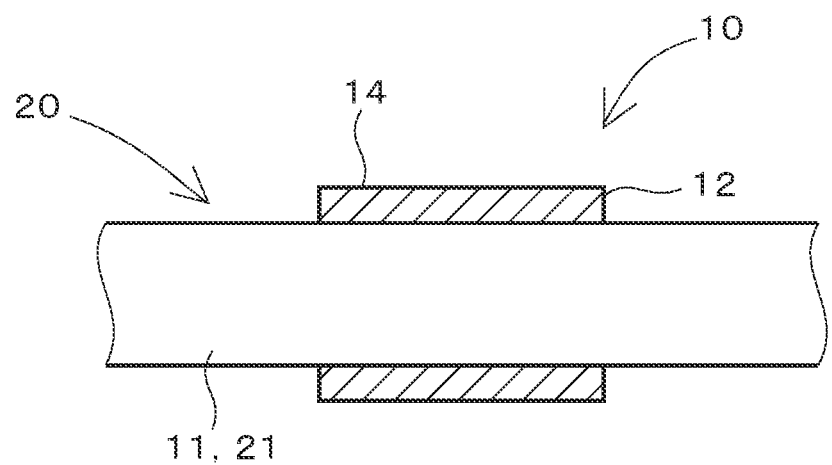
FIG. 4 is a schematic view of a sliding member according to one embodiment applied to a rotating shaft.

The sliding member 10 formed in the present embodiment can be suitably used for a large-scale rotating member 20 having a high surface pressure, such as a rotating shaft or a bearing of a wind power generator as shown in FIG. 4, for example. In the case of an example shown in FIG. 4, the rotating member 20 includes a substrate 11 and an alloy layer 12. The alloy layer 12 is directly provided on a rotating shaft portion 21 used as the substrate 11 by welding. In this case, the outer peripheral surface of the alloy layer 12 forms the sliding surface 14. By directly providing the alloy layer 12 on the rotating shaft portion 21 by welding in this manner, the rotating member 20 can cope with high surface pressure. In the case of using the sliding member 10 as the rotating member 20 of a wind power generator in this manner, the alloy layer 12 is cut to a thickness of about 0.5 mm after being built up on the rotating shaft portion 21 serving as the substrate 11 by welding. The intermediate layer 16 formed at the interface 13 with the substrate 11 in the alloy layer 12 is about 1.0 to 20 μm in this case. In addition, the roughness Ra of the sliding surface 14 is set to about 0.3 to 0.6. The sliding member 10 may have a configuration in which the alloy layer 12 is formed by welding on the inner peripheral side of a cylindrical, semi-cylindrical, or cylindrical piece-shaped substrate 11 divided into three or more pieces in the circumferential direction, such as a bearing member.

Next, a method for producing the sliding member 10 is described.

Figure 5:
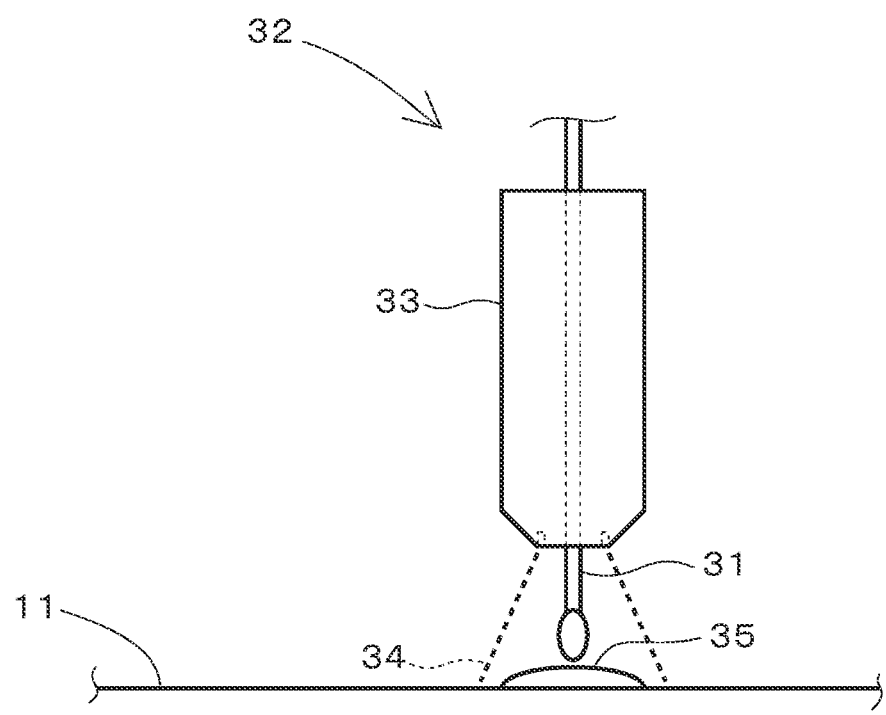
FIG. 5 is a schematic view of welding equipment for welding an alloy layer of a sliding member according to one embodiment to a substrate.

The alloy layer 12 is formed by welding on the surface of the substrate 11 containing Fe as the main component. Specifically, the alloy layer 12 is formed by welding a welding material 31 to the substrate 11 as shown in FIG. 5, with the welding material 31 as the main material. The welding material 31 is a Cu-base alloy that forms the alloy layer 12 and contains Ni as an additive element having a high affinity with the substrate 11. In addition to Ni above, the welding material 31 contains Sn and an inevitable impurity. In other words, the welding material 31 is a Cu-base alloy containing Ni, Sn, and an inevitable impurity. The additive element is not limited to Ni, and any element can be used as long as it has a high affinity with Fe serving as the substrate 11.

The welding material 31 is formed, for example, in the form of a wire or a string obtained by twisting together a plurality of fibrous metals, and is supplied to a supply portion 33 of welding equipment 32 as shown in FIG. 5. The supplied welding material 31 is melted by an arc discharge between the welding equipment 32 and the substrate 11 to migrate to the substrate 11. A welding method used in the welding equipment 32 is preferably MIG welding with an inert gas as a shielding gas 34. In addition, the welding method is more preferably MIG welding employing a CMT method in which the supplied welding material 31 is driven at high speed in the forward direction or the reverse direction. Furthermore, the welding method may be TIG welding as long as the conditions are satisfied. During this welding, the heat-affected depth to the substrate 11 is preferably 200 µm or less.

A welding layer 35 is formed on the substrate 11 by welding the welding material 31 to the substrate 11. At the same time, the molten welding material 31 forms an alloy with Fe, which is a substrate element that forms the substrate 11, at the interface 13 with the substrate 11. In other words, the molten high-temperature welding material 31 migrates to the substrate 11, thereby forming an alloy containing Fe, which is the substrate element, at the interface 13 of the substrate 11. The alloy formed at the interface 13 of the substrate 11 serves as the intermediate layer 16 shown in FIG. 1.

By welding the welding material 31 to the substrate 11, the high-temperature welding material 31 melts the surface of the substrate 11 at the interface 13 with the substrate 11 and is mixed with Fe, which is a substrate element. Thus, the welding layer 35 formed of the welding material 31 has an intermediate layer 16 composed of an alloy containing Fe at the interface 13 with the substrate 11 and a body layer 15 containing no Fe on the side far from the substrate 11 except for the intermediate layer 16. In other words, the welding layer 35 has the intermediate layer 16 containing Fe and the body layer 15 containing no Fe inside the welding layer 35.

The welding layer 35 is a precursor of the alloy layer 12 in the sliding member 10 shown in FIG. 1. Once the welding layer 35 is formed on the substrate 11 by welding, the welding layer 35 is subjected to heat treatment. Specifically, the welding layer 35 formed on the substrate 11 is subjected to aging treatment at a temperature of 370 to 430° C. for 4 to 10 hours. Through this aging treatment, the welding layer 35 generates the hard phase 17 and the flake phase 18. That is, aging treatment of the welding layer 35 produces a microstructure in which the hard phase 17 and the flake phase 18 are formed in a layer form as shown in FIG. 2, thus serving as the alloy layer 12.

In the sliding member 10 subjected to the aging treatment to form the alloy layer 12, the alloy layer 12 is cut to a desired thickness. The alloy layer 12 is cut to a thickness of, for example, 0.5 mm or less. In addition, through the aging treatment described above, the hard phase 17 has an average diameter of 0.5 to 2.0 µm. The surface roughness Ra of the cut alloy layer 12 is preferably 0.3 to 0.6.

As described above, the alloy layer 12 according to one embodiment has a body layer 15 and an intermediate layer 16. The body layer 15 and the intermediate layer 16 are formed simultaneously when the alloy layer 12 is formed by welding. That is, the Cu-base alloy deposited on the substrate 11 during welding generates an alloy to be the intermediate layer 16 at the interface 13 with the substrate 11 from Ni, Sn, and Cu which are derived from the Cu-base alloy and Fe derived from the substrate 11. On the other hand, the body layer 15 is formed of the Cu-base alloy in a region excluding the interface 13. In the present embodiment, the intermediate layer 16 is formed at the interface 13 with the substrate 11 simultaneously when the alloy layer 12 is welded, in addition to the body layer 15. As a result, the phenomenon of insertion of Cu contained in the alloy layer 12 into the Fe of the substrate 11 is prevented by the intermediate layer 16, and cracking and delamination caused by this insertion are reduced.

In the alloy layer 12 according to one embodiment, the ratio R of the total area of the hard phases 17 to the observation section S of the upper region A2 is 1.2 to 3.0, where the ratio of the total area of the hard phases 17 to the observation section S of the lower region A1 is set at 1. By making a distribution ratio of the hard phase 17 different between the lower region A1 and the upper region A2, wear of the alloy layer 12 is reduced in the upper region A2, and delamination between the substrate 11 and the alloy layer 12 is reduced in the lower region A1.

Therefore, the strength of the sliding member 10 can be further improved without requiring man-hours necessary to form the intermediate layer 16.

Examples and Comparative Examples of the sliding member 10 are described below.

Examples and Comparative Examples were evaluated by adhesion and sliding tests. The test piece was produced by buildup welding to an Fe-based substrate 11 of a Cu9Ni6Sn alloy as the alloy layer 12. The Cu9Ni6Sn alloy was welded by MIG welding with repeated feeding of a wire of the alloy into a molten pool at high speed in the forward direction or the reverse direction. After being formed by welding, the alloy layer 12 was subjected to the heat treatment specified in the Examples and Comparative Examples. After the heat treatment, the test piece was machined into a predetermined shape by, for example, cutting and polishing.

Figure 6:
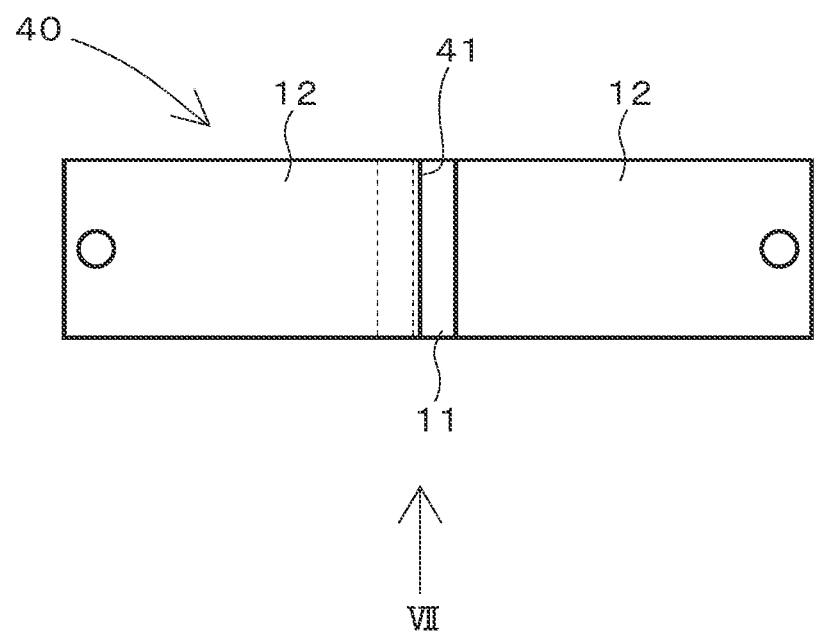
FIG. 6 is a schematic view of a test piece of a sliding member according to one embodiment.
Figure 7:
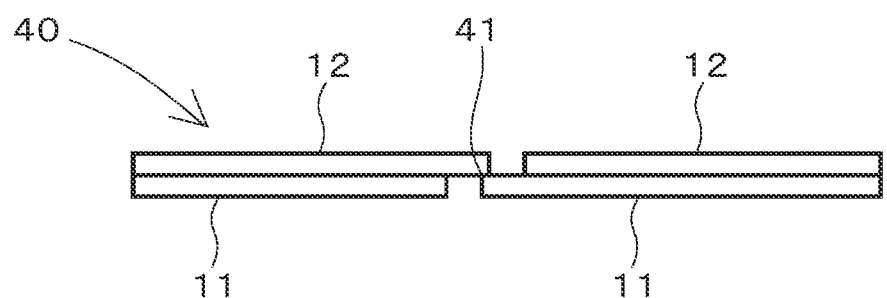
FIG. 7 is a schematic view from the direction of an arrow VII in FIG. 6.

In the adhesion test, the adhesive force between the substrate 11 and the alloy layer 12 was evaluated as the adhesive strength of the sliding member 10. In the adhesion test, a test piece 40 in which the substrate 11 and the alloy layer 12 were bonded to each other with the same bonding area as shown in FIGS. 6 and 7 was used. A tensile load was applied to both ends of the test piece 40, and the maximum tensile force at which a bonded portion 41 fractured was measured as the adhesive strength. The test piece 40 used had an overlap of 9 mm×0.3 mm and a bonding area of 2.7 mm$^2$ at the bonded portion 41 between the substrate 11 and the alloy layer 12.

Figure 8:
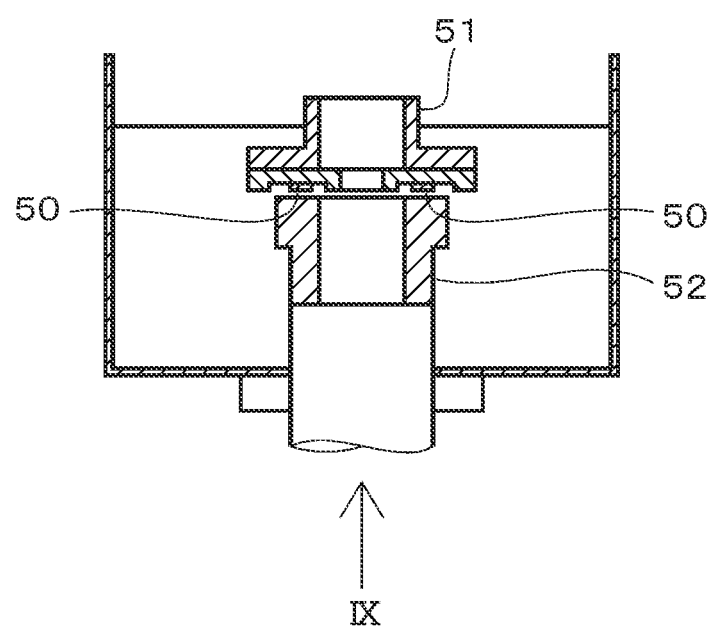
FIG. 8 is a schematic view of test equipment for conducting seizure and wear tests on a sliding member according to one embodiment.
Figure 9:
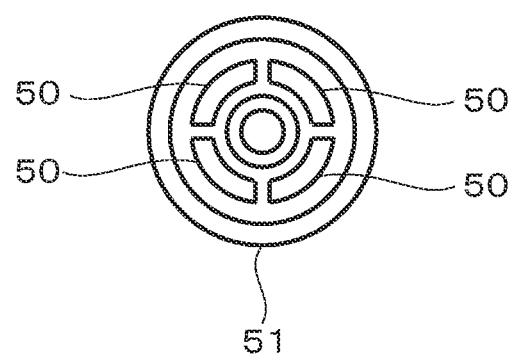
FIG. 9 is schematic view of a test piece mounted on the test equipment from the direction of an arrow IX in FIG. 8.

The sliding test was evaluated by a seizure test and a wear test as the strength of the sliding member 10. In the seizure test, the maximum surface pressure without seizure of the sliding member 10 was evaluated as the seizure resistance. In the wear test, the abrasion loss of the sliding member 10 was evaluated as the wear resistance. The seizure test and the wear test in the sliding test were each measured by attaching a test piece 50 formed in an arc ring shape as shown in FIGS. 8 and 9 to a holder 51 and pressing the test piece 50 attached to the holder 51 against a cylindrical test shaft 52. The sliding tests were a seizure test under the conditions shown in FIG. 10 and a wear test under the conditions shown in FIG. 11 to evaluate Example and Comparative Example of the sliding member 10.

FIG. 12 shows test results of Examples and Comparative Examples. In the adhesion test, an adhesive strength of 300 N/mm 2 or more was considered "eligible"; in the seizure test, a maximum surface pressure of 18 MPa or more without seizure was considered "eligible"; and in the wear test, an abrasion loss of 5 μm or less was considered "eligible". Note that in the seizure test, 25 MPa is the maximum value due to constraints imposed by the performance of the test equipment.

Although Examples 1 to 7 differ from each other in the materials of the substrate 11 or the welding method, the Cu-base alloys that form the alloy layer 12 are the same. In other words, Examples 1 to 7 share the composition of the body layer 15 and the intermediate layer 16 included in the alloy layer 12. Examples 1 to 7 are subjected to heat treatment at a temperature of 370 to 430° C. for 4 to 10 hours. In Examples 1 to 7 subjected to this heat treatment, the ratio R of the total area of the hard phases 17 to the observation section S of the upper region A2 is 1.2 to 3.0, where the ratio of the total area of the hard phases 17 to the observation section S of the lower region A1 is set at 1. Examples 1 to 7 each have an adhesive strength of 300 N/mm 2 or more. In Examples 1 to 7, the maximum surface pressure without seizure is 25 MPa or more, while the abrasion loss is 5 μm or less.

Example 8 has a lower heat treatment temperature of 360° C. Therefore, in Comparative Example 1, both the average particle size of the hard phase 17 formed and the ratio R of the total area of the hard phase 17 are smaller than in Examples 1 to 7. As a result, it is found that Comparative Example 1 has a lower sliding test result. On the other hand, Comparative Example 2 has a higher heat treatment temperature of 450° C. Therefore, the average particle size of the hard phase 17 is larger in Comparative Example 2 than in Examples 1 to 7. In Comparative Example 2, the ratio R of the total area of the hard phase 17 in the upper region A2 to that in the lower region A1 is excessive. As a result, it can be seen that Comparative Example 2 has a lower sliding test result.

None of Comparative Examples 3 to 5 contain an additive element having a high affinity with Fe in the alloy layer 12. Therefore, in Comparative Examples 3 to 5, a layer corresponding to the intermediate layer 16 is not formed in the alloy layer 12, and the hard phase 17 is not generated even when heat treatment is applied. As a result, it is found that results of both the adhesion test and the sliding test are deteriorated in Comparative Examples 3 to 5. Especially in Comparative Example 5, the substrate 11 and the Cu-based alloy layer 12 do not adhere to each other, and therefore the adhesion test cannot be carried out.

Comparative Example 6 shares the composition of the alloy layer 12 and the conditions of heat treatment with Example 1 but does not have a layer corresponding to the intermediate layer 16 in the alloy layer 12. Therefore, in Comparative Example 6, the hard phase 17 is almost uniformly distributed throughout the alloy layer 12, and the ratio R of the total areas is 1.0. As a result, Comparative Example 6 has eligible sliding test results but not sufficient adhesive strength. In Comparative Examples 7 and 8, prior to the formation of the alloy layer 12, a layer corresponding to the intermediate layer 16, which has a high affinity with the substrate 11, was formed on the substrate 11 in advance. Although the adhesive strength between the substrate 11 and the alloy layer 12 is ensured to be high in Comparative Example 7 and Comparative Example 8, the hard phase 17 is not generated even if heat treatment is applied because the composition of the alloy layer 12 is different. As a result, Comparative Examples 7 and 8 have lower sliding test results.

The present invention described above is not limited to the foregoing embodiments but can be applied to various embodiments without departing from the scope of the present invention.

What is claimed is:

1. A sliding member comprising:
   a substrate containing Fe as a main component; and
   an alloy layer overlaid on the substrate and composed of a Cu-base alloy containing 6 to 12% by mass of Ni and 3 to 9% by mass of Sn,
   the alloy layer comprising:
   a body layer formed of the Cu-base alloy;
   an intermediate layer composed of an alloy containing Ni, Sn, and Cu which are derived from the Cu-base alloy and Fe derived from the substrate; and
   a hard phase composed of a compound of Ni, Sn, and Cu which are derived from the Cu-base alloy as well as a flake phase comprising the hard phase and a matrix of the Cu-base alloy,
   wherein in an arbitrary observation section taken along a thickness direction of the alloy layer, when the alloy layer is divided at the middle in the thickness direction to set a side close to the substrate as a lower region and the other side away from the substrate as an upper region,
   a ratio of a total area of the hard phases to the observation section of the upper region is 1.2 to 3.0, where a ratio of the total area of the hard phases to the observation section of the lower region is set at 1.

2. A method for producing a sliding member, the method comprising:
   a welding step of welding a welding material containing an additive element, which has a high affinity with a substrate, to the substrate to form a welding layer;
   an intermediate layer-forming step of forming, at the same time as the welding step, an intermediate layer, which comprises the additive element contained in the welding material and a substrate element forming the substrate, at an edge on a substrate side of the welding layer; and
   an aging step of heating the welded layer to form an alloy layer, after formation of the welded layer comprising the intermediate layer.

3. The method for producing the sliding member according to claim 2, wherein:
   the substrate contains Fe as a main component, and
   the welding material is a Cu—Sn—Ni alloy.

4. The method for producing the sliding member according to claim 2, wherein the aging step is performed at a temperature of 370 to 430° C. for 4 to 10 hours.

\* \* \* \* \*